(12) United States Patent
Honda

(10) Patent No.: US 7,711,027 B2
(45) Date of Patent: May 4, 2010

(54) WIRELESS COMMUNICATION CONTROL METHOD AND WIRELESS COMMUNICATION DEVICE

(75) Inventor: Yuji Honda, Minato-ku (JP)

(73) Assignee: Oki Semiconductors Co., Ltd., Tokyo (JP)

( * ) Notice: Subject to any disclaimer, the term of this patent is extended or adjusted under 35 U.S.C. 154(b) by 900 days.

(21) Appl. No.: 11/188,664

(22) Filed: Jul. 26, 2005

(65) Prior Publication Data
US 2006/0056492 A1     Mar. 16, 2006

(30) Foreign Application Priority Data
Sep. 16, 2004  (JP) .............................. 2004-270007

(51) Int. Cl.
*H04B 1/00* (2006.01)
(52) U.S. Cl. .................... 375/132; 375/130; 375/133; 375/136; 375/232; 455/226.2; 455/447
(58) Field of Classification Search ......... 375/130–138, 375/142–150, 219, 306, 343, 350, 355, 359, 375/220, 232, 260, 287, 294, 295, 316, 346, 375/348, 353, 354; 455/63.1, 447, 226
See application file for complete search history.

(56) References Cited

U.S. PATENT DOCUMENTS

| 7,079,516 B2 * | 7/2006 | You et al. ................... 370/337 |
| 7,103,316 B1 * | 9/2006 | Hall .......................... 455/63.1 |
| 7,634,231 B2 * | 12/2009 | Hundal ...................... 455/63.1 |
| 2002/0122462 A1 * | 9/2002 | Batra et al. ................. 375/132 |
| 2004/0258137 A1 * | 12/2004 | Felbecker et al. ........... 375/133 |
| 2005/0020271 A1 * | 1/2005 | Fukuda et al. .............. 455/447 |
| 2009/0185601 A1 * | 7/2009 | Felbecker et al. ........... 375/133 |

FOREIGN PATENT DOCUMENTS

JP      2001-128232 A    11/2001

* cited by examiner

*Primary Examiner*—Shuwang Liu
*Assistant Examiner*—Hirdepal Singh
(74) *Attorney, Agent, or Firm*—Volentine & Whitt, PLLC

(57) ABSTRACT

A wireless communication control method of the present invention for wireless communication devices employing Adaptive Frequency Hopping that switches among a plurality of channels except a channel subject to interference by interference waves in a predetermined frequency band for communication includes steps of creating, setting, processing reception, and assessing channels. In the creating step, a hopping pattern is created by using available channels. In the setting step, channels used for the communication are set based on the hopping pattern. In the processing reception step, received signals on the channels are processed. In the assessing channels step, reception conditions of channels are assessed by both the first assessment step that abnormal conditions in communication caused by interference waves are detected, and the second assessment step that the abnormal condition in communication caused by mutual interference with constant or intermittent interference waves is detected out of those abnormal conditions.

6 Claims, 6 Drawing Sheets

| Classification Result of Master | Classification Result of Slave | AFH Channel Map |
| --- | --- | --- |
| Good | Good | Used |
| Good | Unknown | Used |
| Good | Bad | Take Previous |
| Unknown | Good | Used |
| Unknown | Unknown | Take Previous |
| Unknown | Bad | Unused |
| Bad | Good | Take Previous |
| Bad | Unknown | Unused |
| Bad | Bad | Unused |

Fig.6

WIRELESS COMMUNICATION CONTROL METHOD AND WIRELESS COMMUNICATION DEVICE

BACKGROUND OF THE INVENTION

1. Field of the Invention

The present invention relates to a wireless communication control method and a wireless communication device. More specifically, the invention relates to a wireless communication control method of a wireless communication device employing Adaptive Frequency Hopping (AFH) that switches among a plurality of channels except a channel subject to interference by interference waves in a predetermined frequency band for communication and a wireless communication device thereof.

2. Background Information

A BLUETOOTH communications system employs a Frequency Hopping Spread Spectrum (FH-SS) method providing 79 channels, each with 1 MHz bandwidth, in the 2.4 GHz band (ISM band, i.e., Industrial Scientific Medical Band). The frequency hopping Spread Spectrum method also switches these channels at the rate of 1600 times per second. In the 2.4 GHz band (ISM band), since radio waves from other devices such as wireless Local Area Networks (WLAN) and microwave ovens coexist additionally with radio waves of the BLUETOOTH communications system, the radio waves from other devices may interfere as interfering waves with the radio waves of the BLUETOOTH. In order to reduce mutual interference between the radio waves of the BLUETOOTH and other devices, BLUETOOTH ver 1.2 employs Adaptive Frequency Hopping (AFH) that performs frequency hopping by using channels, which do not interfere with the radio waves from other devices and are restricted to channels that do not suffer from interference.

Japanese Patent Publication JP-A-2001-128232, especially page 2-4, and FIGS. 1-2 thereof, shows a communication channels setting method in the transmission/reception with a plurality of channels, such as Time Division Multiple Access (TDMA), but not to systems like BLUETOOTH with AFH. In the communication channels setting method, signal strength of radio signals is measured by putting a radio frequency (RF) portion in a receiving mode even in the time frames allocated to transmitting channels, and then channels for use are selected depending on the signal strength. Due to this structure, the channels that wireless devices of the same kind use on the perimeter are not selected, and the channels that do not interfere with communications among other wireless devices are selected. Thus, the mutual interference is reduced. Japanese Patent Publication JP-A-2001-128232 is hereby incorporated by reference.

As described above, the BLUETOOTH wireless communication system employs the Adaptive Frequency Hopping (AFH) and this causes mutual interference by interference waves to be reduced. In general, an assessment of the receiving state of each channel is performed by receiving error information, such as information on whether or not sync word error, packet header error, or payload error (e.g., the Cycle Redundancy Check (CRC) error and the Forward Error Connection (FEC) error) exists, and Received Signal Strength Indicator (RSSI) information. The algorithm of the channel assessment method is dependent on algorithm implementation by wireless device makers.

It is conceivable that mutual interference with interference waves from other devices and reduction of signal strength of receiving signals resulting from the degree of physical distance between BLUETOOTH communication devices, for instance, are factors of inducing a receiving error. Further, interference waves from other devices include temporary interference waves and constant or intermittent interference waves, such as interference waves from a WLAN or a microwave oven. The AFH restricts the use of channels in which a receiving error occurred. However, it is not desirable to set an error, such as an error that resulted from temporary interference waves and the mere degree of physical distance, as a target to restrict use of channels in which these errors occurred. This is because the number of channels available for communication decreases by setting these errors as targets to restrict use of channels, and this causes a spreading ratio of transmitting signals to be decreased. Therefore, an algorithm for channel assessment to restrict only use of channels that face mutual interference by constant or intermittent interference waves is required.

The communication channel setting method described in the Japanese Patent Publication JP-A-2001-128232 relates to the WLAN with the TDMA, but not to the system such as BLUETOOTH communication system with AFH.

In view of the above, it will be apparent to those skilled in the art from this disclosure that there exists a need for an improved wireless communication method and wireless communication device. This invention addresses this need in the art as well as other needs, which will become apparent to those skilled in the art from this disclosure.

SUMMARY OF THE INVENTION

A wireless communication control method of the present invention for wireless communication devices employing Adaptive Frequency Hopping that switches among a plurality of channels except a channel subject to interference by interference waves in a predetermined frequency band for communication is provided. The method includes steps of creating, setting, processing reception, and assessing channels. In the creating step, a hopping pattern is created by using available channels. In the setting step, channels used for the communication are set based on the hopping pattern. In the processing reception step, received signals on the channels are processed. In the assessing channels step, reception conditions of channels are assessed by both the first assessment step in which abnormal conditions in communication caused by interference waves are detected, and the second assessment step in which the abnormal condition in communication caused by mutual interference with constant or intermittent interference waves is detected from those abnormal conditions.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 6 is a view of a conversion chart of classification results and AFH channel mapping.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

The BLUETOOTH Communication System

Figure 1:
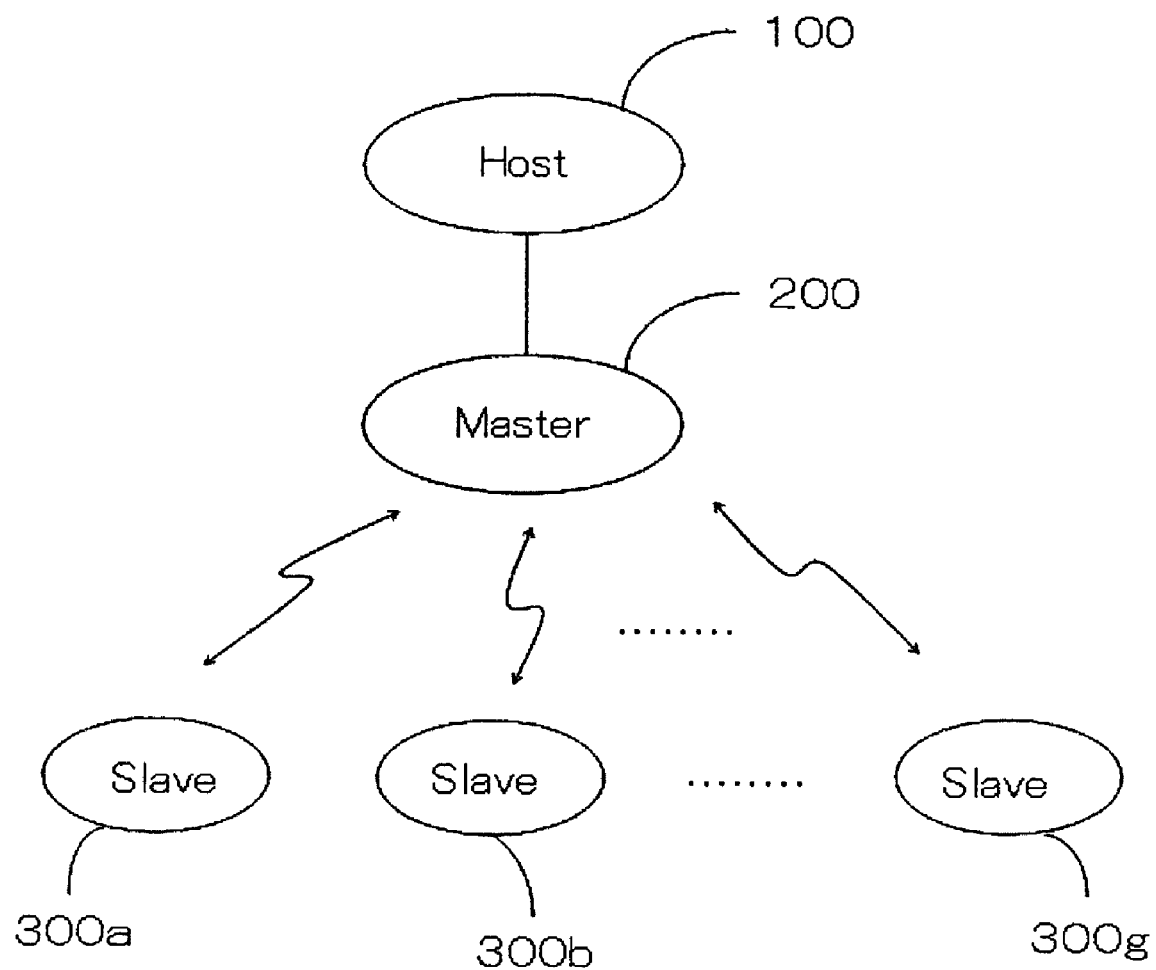
FIG. 1 is a view of a schematic diagram showing a wireless communication system in accordance with a preferred embodiment of the present invention.

FIG. 1 is a schematic view of a wireless communication system employing a BLUETOOTH communication method with Adaptive Frequency Hopping (AFH) in accordance with a preferred embodiment of the present invention. This BLUETOOTH communication system includes a host 100, a master 200, and a plurality of slaves 300a-300g, and employs a connection, called "piconet," which connects a plurality of slaves 300a-300g (seven slaves in general) to a master 200.

The host 100 is a device that controls communication between the master 200 and the plurality of slaves 300a-300g. The host 100 is composed of a personal computer (PC), and is preferably connected to the master 200 via a USB cable or a UART cable. In the case that the master 200 is installed in a small device such as a cellular phone, the host 100 may be a program to control the BLUETOOTH communication among the master 200 and the plurality of slave 300a-300gs. The master 200 is a wireless communication device that communicates with the slaves 300a-300g based on control from the host 100. The slaves 300a-300g are wireless communication devices that communicate with the master 200 based on control from the master 200.

Figure 2:
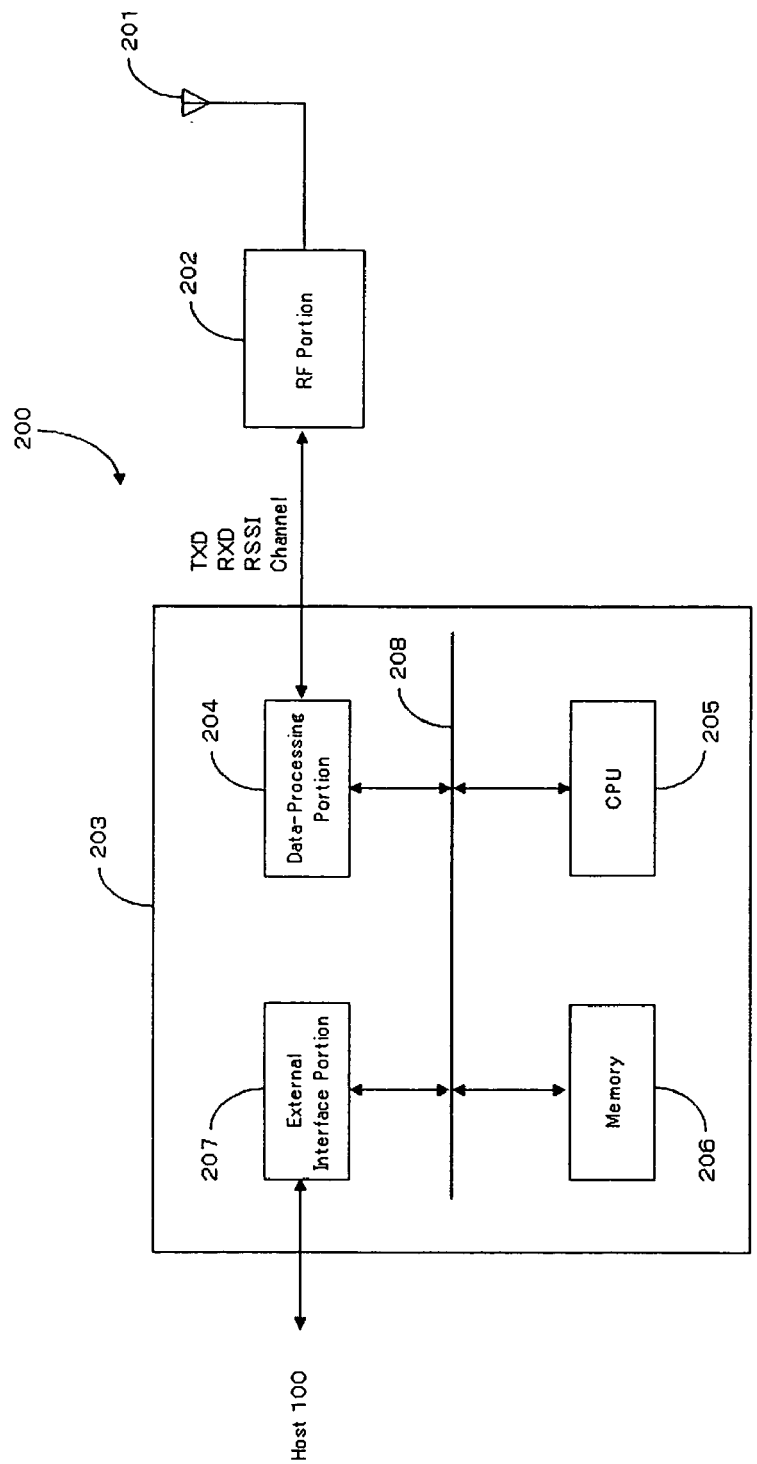
FIG. 2 is a view of a schematic diagram showing a master of the wireless communication system.

FIG. 2 is a schematic diagram showing the master 200. The master 200 includes an antenna 201, a Radio Frequency (RF) portion 202, and a baseband portion 203. The RF portion 202 converts an RF signal (receive signal) of radio waves received by the antenna 201 into receive data RXD, which are digital signals, in a channel set by a data-processing portion 204 described later. The RF portion 202 converts transmission data TXD, which are digital signals, into the RF signal (transmission signal) and provides it as radio waves through the antenna 201 in the channel set by the data-processing portion 204. In addition, the RF portion 202 measures a Receive Signal Strength Indicator (RSSI) of the receive signal, and provides RSSI data, which are converted from a measured value, to the baseband portion 203.

The baseband portion 203 includes the data-processing portion 204, a CPU 205, a memory 206, and an external interface portion 207. The data-processing portion 204, the CPU 205, the memory 206, and the external interface portion 207 are connected to each other through a bus 208. The external interface portion 207 is connected to the host 100, and interfaces with the host 100. The data-processing portion 204 processes the receive data RXD based on control from the CPU 205. In addition, the data-processing portion 204 creates the transmitting data TXD and provides it to the RF portion 202 based on control from the CPU 205. The data-processing portion 204 includes a resistor, and temporarily records the RSSI data received from the RF portion 202 and available channels information received from the CPU 205 on the resistor. Additionally, the data-processing portion 204 creates a hopping pattern containing switching order for channels based on available channel information recorded on the resistor, and provides a transmission/reception channel (carrier channel) to the RF portion 202. The CPU 205 controls the data-processing portion 204 based on communication with the host 100 though the external interface portion 207. The memory 206 stores a main program such as a communication protocol program performed by the CPU 205, an assessment result of a reception condition of a channel, and a processing result in the CPU 205. The memory 206 is composed of a nonvolatile memory such as a flash memory and a mask ROM, and a volatile memory such as RAM, for example.

The above description describes the construction of the master 200. The construction of each of the slaves 300a-g is similar to or the same as that of the master 200, thus their description is omitted.

Communication Time Chart

Figure 3:
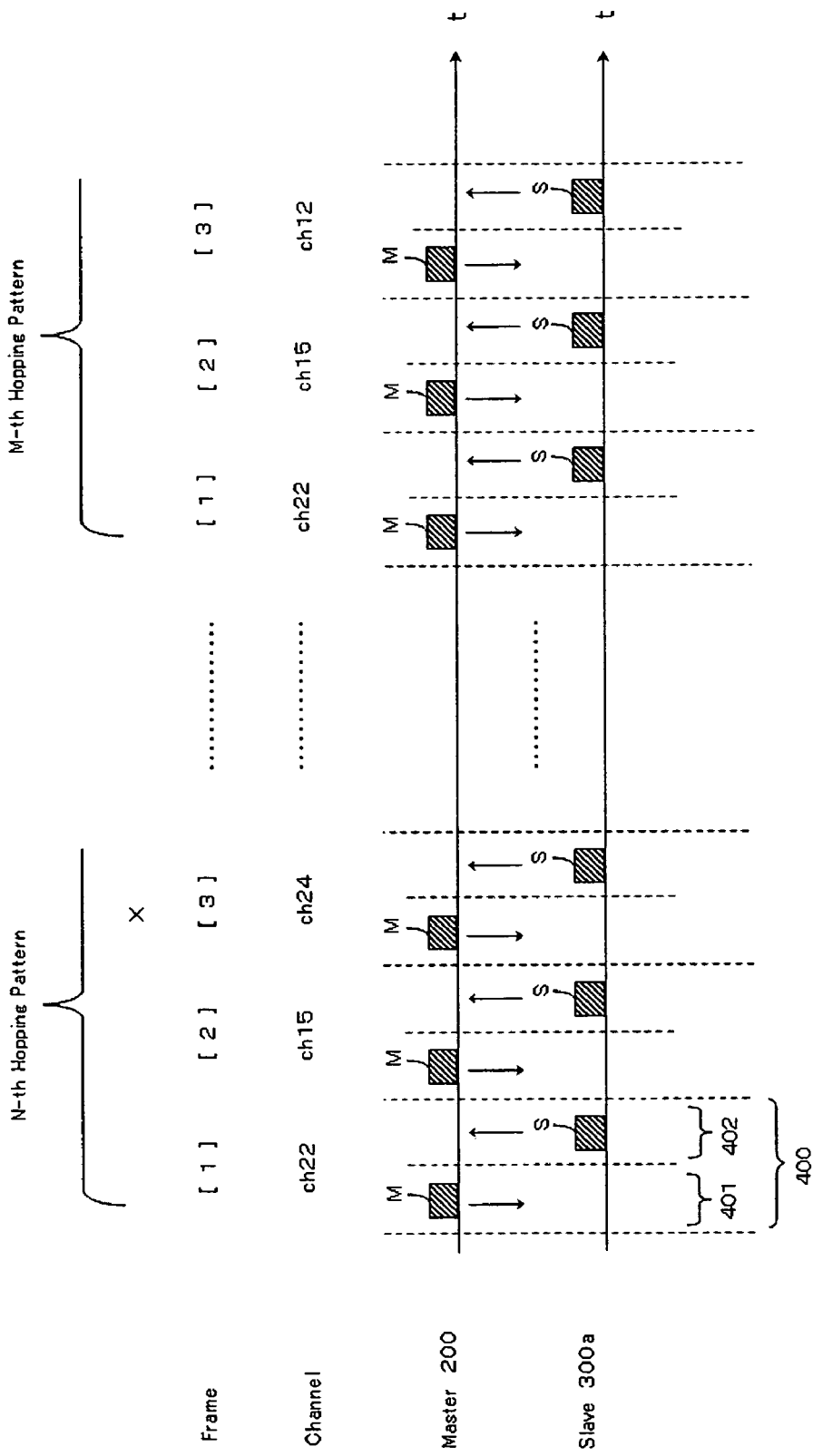
FIG. 3 is a view of a timing chart of transmission/reception data between the master and a slave of the wireless communication system.

FIG. 3 is a timing chart of communication performed between the master 200 and a slave 300a. Hereafter, though the following description will describe communication between the master 200 and the slave 300a as one example, communication between the master 200 and the other slaves 300b-g is similar or identical to the example.

The frame 400 represents a frame used as a unit for transmission/reception of data in the BLUETOOTH communication. The frame 400 includes a slot 401 and a slot 402. The slot 401 is allocated for data transmission from the master 200 to the slave 300a. The slot 402 is allocated for data transmission from the slave 300a to the master 200. In addition, one slot is equal to 625 μS. M represents transmission data TXD transmitted from the master 200 to the slave 300a. S represents transmission data TXD transmitted from the slave 300a to the master 200. The transmission data TXD are thought to be receive data RXD in that the data are received by the master 200.

As described above, with Adaptive Frequency Hopping, if interference waves exist in a channel of the channels set as carrier channels used for data transmission/reception, the channel is restricted from use. In the wireless communication system with Adaptive Frequency Hopping of this embodiment, mutual interference with interference waves is detected with both receive data error information and RSSI information. Further, the use of channels interfered by constant or intermittent interference waves is effectively restricted by rating interference condition in channels. Adaptive Frequency Hopping processing is explained in detail as described below.

The example of FIG. 3 shows a case in which it is assessed that mutual interference caused by constant or intermittent interference waves exists when a channel ch24 is set in a frame [3] of n-th hopping pattern. Referring now to FIGS. 2 and 3, the CPU 205 assesses the reception condition of channels in Adaptive Frequency Hopping processing, and writes the result of the assessment on the memory 206. The CPU 205 creates available channel information based on the result of the channel assessment, and causes the master 200 to transmit an AFH channel map, which includes available channel information and timing information to switch a hopping pattern sequence to the slave 300a. The slave 300a receives the AFH channel map and writes the available channel information in the memory 206. The CPUs 205 of the master 200 and the slave 300a store available channel information, which is written in the memory 206, in the resistor of the data-processing portion 204 with switching timing of the hopping pattern sequence. At or after this timing, the data-processing portions 204 of the master 200 and the slave 300a creates a hopping pattern from available channels. In the example of FIG. 3, the channel ch12 is set as a channel of the frame [3] in an m-th hopping pattern, instead of the channel ch24. In this case, the channel ch12 is the available channel.

As mentioned above, with Adaptive Frequency Hopping, a plurality of channels in the predetermined band is switched in a random fashion to perform communication, and the channel restricted from use because of interference by interference waves is replaced with an available channel.

Adaptive Frequency Hopping Processing

As described above, in the Adaptive Frequency Hopping processing, mutual interference with interference waves is firstly detected with receive data error information and RSSI information. Next, interference condition of channels are rated, and the use of the channels interfered by constant or intermittent interference waves is effectively restricted by changing the ratings in response to the interference condition as needed.

Figure 4:
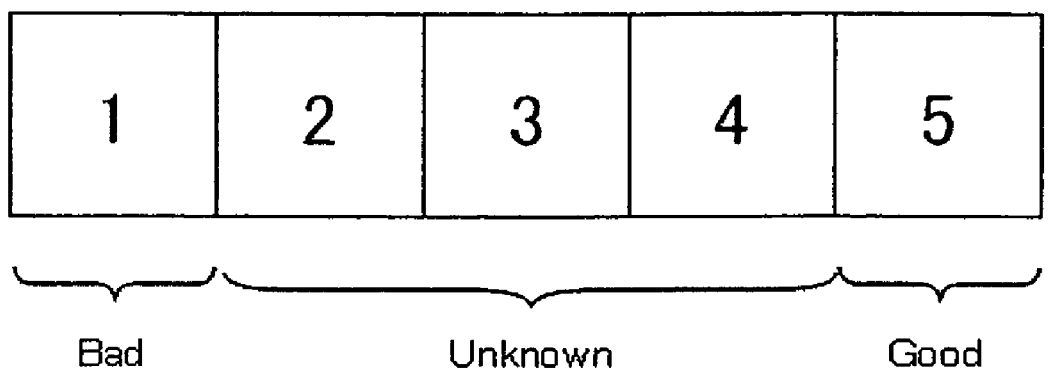
FIG. 4 is a view of a diagram showing rating of interference condition of channels and classification of interference condition of channels in the BLUETOOTH specification.

The Rating for interference condition in channels is explained here in reference to FIG. 4. The rating is an indicator to represent a level of interference condition with interference waves in each of the channels. In the example shown in FIG. 4, the interference condition is rated on a 5-point scale. A rating of 1 represents the worst interference condition (i.e., reception condition is bad). A rating of 5 is the best interference condition (i.e., reception condition is good). Thus, the interference condition with a rating with a large number is treated as better compared to that of a rating with a small number. The default value of the rating can be arbitrarily set to either of 1-5 depending on software. Although the interference condition is rated on 5-point scale in the example of the present embodiment, it should be appreciated that it can also be rated on different-point scales.

In the BLUETOOTH ver 1.2 features, the reception condition of channels is classified into three conditions, "Bad," "Unknown," and "Good." However, the algorithm of the classification is dependent on algorithm implemented by wireless device makers. Therefore, in the present embodiment, the reception condition of channels is classified into three conditions, "Bad," "Unknown," and "Good," based on the above mentioned rating using the 5-point scale. For example, as shown in FIG. 4, a rating of 5 is set as "Good," and rating of 1 is set as "Bad," and ratings of 2-4 are set as "Unknown." It should be appreciated that the reception condition is not necessarily classified based on rating of 5-point scale and it can be classified based on rating of different-point scales depending on the communication environment. For example, a rating of 5 can be set as "Good," and a rating of 4 can be set as "unknown," and ratings of 1-3 can be set as "Bad."

Figure 5:
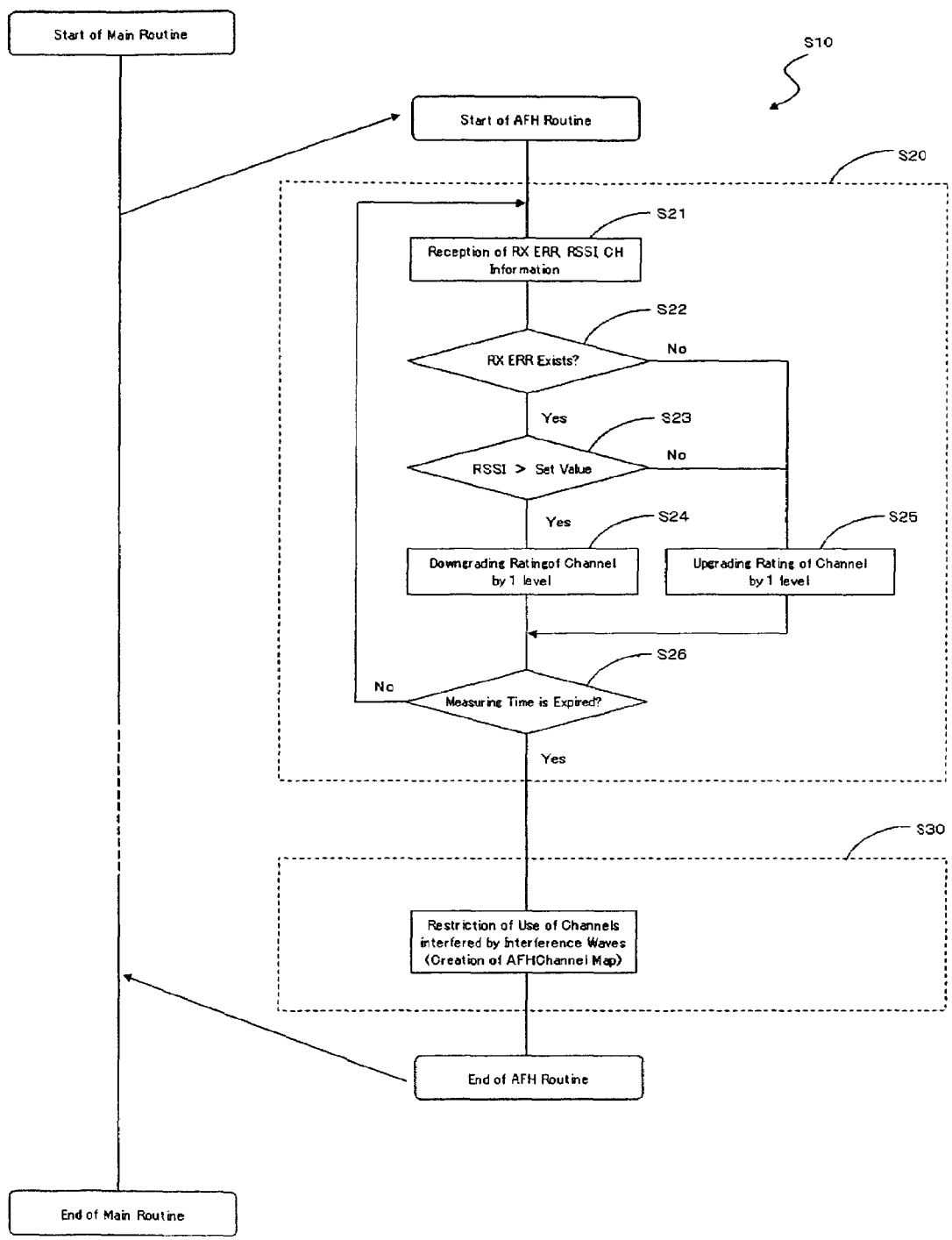
FIG. 5 is a view of a flow chart of a processing of Adaptive Frequency Hopping.

Next, the Adaptive Frequency Hopping (AFH) processing of the present embodiment is explained in reference to a flow chart shown in FIG. 5.

Flow Chart

FIG. 5 is a view of a flow chart showing the Adaptive Frequency Hopping processing (S10) of the present embodiment. The Adaptive Frequency Hopping processing (S10) is branches from a main program, which performs communication processing of the master 200 and the slaves 300, and is performed as a subroutine of the main program.

The Adaptive Frequency Hopping processing (S10) is mainly composed of a channel assessment step (step S20) and a channel use restriction step (step S30). The channel assessment step (step S20) is performed within a predetermined set time, such as 10240 slots (6.4 seconds). In this step, the interference condition is rated on 5-point scale as shown in FIG. 4. The rating operation is performed only for received channels once per a reception slot. In the channel use restriction step (step S30), after completion of the above described predetermined set time, the reception condition of channels are classified into three conditions "Bad," "Unknown," and "Good," which is used in the BLUETOOTH system, based on the result of channel assessment step (step S20) with a rating from the 5-point scale. The result of the channel assessment step is transmitted to the master 200 according to the BLUETOOTH system. The master 200 creates available channel information based on the result of the channel assessment step. The master 200 also creates an AFH channel map including available channel information and timing information to switch the hopping pattern sequence, and switches channels to be used with the AFH channel map.

The channel assessment step (step S20), which an essential part of the present invention, is explained here. Firstly, a default value of the rating for interference condition in channels is set before the channel assessment step (step S20) is performed. Sequences that correspond to each of channels in the memory 206 (ch0-ch78) are prepared and then the default value of the rating is set to each of the sequences. Initialization of the rating is performed on power-on or reset. In addition, the initialization is performed before the above mentioned predetermined set time is expired, and the next channel assessment step is started.

Referring to FIGS. 2 and 5, in step S21, the baseband portion 203 of the master 200 receives receive data (RXD), RSSI information, and channel (CH) information from the RF portion 202. The data processing portion 204 generates receive data error information (RX ERR) when receive data processed in the data-processing portion 204 include an error. The receive data error includes errors such as a sync word error, a packet header error, or a payload error (e.g., Cycle Redundancy Check (CRC) error and Forward Error Connection (FEC) error). The RF portion 202 measures the strength of a receive signal of radio waves from the slave 300a, and the RSSI information is provided to the data-processing portion 204. As in the case of RSSI information, the channel information is also provided to the data-processing portion 204 from the RF portion 202. These pieces of information are temporarily stored on the resistor of the data-processing portion 204, and then stored on the memory 206 through the CPU 205.

In step S22, whether or not the receive data error (RX ERR) information exists is assessed. If the receive data error information exists, in other words, if an error occurs by some sort of problem in the receiving data, the RSSI assessment step (step S23) is performed. On the other hand, if receive data error information does not exist, in other words, if it is assessed that data reception is appropriately executed, the channel upgrading processing (step S25) is performed.

In step S23, the RSSI is compared to a setting value. The set value to assess the strength of RSSI preliminarily sets the value that the master 200 and the slave 300a can communicate with each other in good condition in the environment without other devices generating interference waves around. If the RSSI is larger than the set value, the channel downgrading processing (step S24) is performed. On the other hand, if the RSSI is smaller than the set value, the channel upgrading processing (step S25) is performed.

In step S24, a rating of a channel is downgraded by one level, based on the results of the assessment of the receive data error information (step S22) and the assessment of the RSSI. Referring to the flow chart in FIG. 5, the downgrading processing of step S24 is performed when a reception error occurs and when the RSSI is larger than the set value. This is interpreted as follows. When the RSSI is larger than the set value, this indicates that the strength of radio waves is at least adequate, in other words, a physical obstacle does not exist. However, when reception error occurs, this indicates that a channel may face mutual interference resulting from interference waves. Therefore, in these cases, if it is assessed that a channel faces mutual interference by interference waves, a rating of a channel is downgraded.

In step S25, a rating of a channel is upgraded by one level based on the results of the assessment of the receive data error information (step S22) and the assessment of the RSSI (step S23). Referring to the flow chart in FIG. 5, the upgrading processing of step S25 is performed when a reception error does not occur, or when reception error occurs and the RSSI is smaller than the set value. This is interpreted as follows. When a reception error does not occur, this indicates that communication was normally executed. In addition, when a reception error occurs and the RSSI is smaller than the set value, this indicates that there is a possibility that the master 200 or the slave 300 did not transit data or the strength of radio waves is not adequate because of a physical obstacle. However, this indicates that there is at least a possibility that interference waves do not exist in reception channels. Therefore, in these cases, if it is assessed that a channel does not face mutual interference by interference waves, a rating of a channel is upgraded. In step S26, whether or not the predetermined set time is expired is assessed. If the set time is not expired, step S21 is performed and the rating operation of channels is executed again. If the set time has expired, ratings of channels, that is, ratings of 1-5, are written on the memory 206, and the channel use restriction step (step S30) is performed. In the Adaptive Frequency Hopping processing of the present embodiment, the use of channels that are interfered by constant or intermittent interference waves can be effectively restricted. This is because of the following reasons. Here, it is assumed that the relationship between rating using 5-points as to interference condition and classification of "Bad," "Unknown," and "Good" in the features of the BLUETOOTH system is defined as shown in FIG. 4. Further, it is defined here that the use of a channel is restricted when the channel is classified as "Bad" by both the master 200 and the slave 300, or when the channel is classified as "Bad" by either of the master 200 and slave 300 and classified as "Unknown" by the other, as shown in FIG. 6. For example, if a channel ch1 with the rating of 3 is interfered by interference waves in certain measuring time T1 in the channel assessment step (step S20), a rating of the channel is set to a rating of 2 by downgrading it by 1 level. If the channel is continuously interfered by interference waves in the subsequent measuring time T2, a rating of the channel is set to a rating of 1 by further downgrading it by 1 level. Moreover, if the channel is continuously interfered by interference waves, the rating of the channel is maintained as a rating of 1 in or after the subsequent measuring time T3. Next, if the measuring time has expired while the rating of the channel is maintained as a rating of 1, the channel ch1 is classified as "Bad" and the use of the channel is restricted. Thus, the use of a channel constantly interfered by interference waves is avoided, and a channel intermittently interfered by interference waves tends to be classified as a channel with low rating.

On the other hand, if the channel is not interfered by interference waves in the above mentioned measuring time T3, the rating of channel ch1 is set to a rating of 2 by upgrading it by 1 level. If the channel is not interfered by interference waves as it is, the rating of the channel ch1 is upgraded. Therefore, the use of the channel ch1 is not restricted. Further, even if the channel is interfered by interference waves and the rating of the channel is downgraded, the rating of the channel is upgraded at the time when the interference waves disappear if the interference waves temporarily occur. Therefore, the use of the channel ch1 is not restricted.

Operation/Working-Effect

According to the present embodiment, assessment of the reception condition of channels is performed by two separate steps. As seen in FIG. 5, in the first channel assessment step (steps S22 and S23), the abnormal conditions in communication are detected by the use of the reception error information and the RSSI information. Given this structure, the reception error that results from mutual interference with interference waves can be effectively detected in the first step. Further, in the second channel assessment step (steps S24 and S25), distinction is made between mutual interference resulting from constant or intermittent interference waves, and temporary mutual interference resulting from other wireless communication devices employing the Adaptive Frequency Hopping, by setting a predetermined rating of interference condition in a channel and changing the rating depending on the interference condition for the predetermined set time as needed. Due to this structure, only mutual interference resulting from constant or intermittent interference waves can be avoided, and more accurate channel assessment results can be obtained. As a result, mutual interference can be decreased and a spreading ratio in spread coding can be improved.

This application claims priority to Japanese Patent Application No. 2004-27007. This entire disclosure of Japanese Patent Application No. 2004-27007 is hereby incorporated herein by reference.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A wireless communication control method for wireless communication devices comprising:
employing Adaptive Frequency Hopping being configured to switch among a plurality of channels except a channel subject to interference by interference waves in a predetermined frequency;
creating a hopping pattern using available channels;
setting channels being used to communicate based on said hopping pattern;
processing received signals on said channels;
assessing reception conditions of channels said by both a first assessment to detect a group of abnormal conditions in communication caused by interference waves, and a second assessment to detect an abnormal condition in communication caused by mutual interference with constant or intermittent interference waves from said group of abnormal conditions,
wherein said first assessment detects said group of abnormal conditions based on reception error information and Receive Signal Strength Indicator, and
wherein said first assessment assesses that an interference by interference waves exists if both said reception error information is detected and said Receive Signal Strength Indicator is larger than a predetermined set value, and wherein said first assessment assesses that an interference by interference waves does not exist if at least one of said reception error information is not detected and said Receive Signal Strength Indicator is not larger than the predetermined value, and
wherein said second assessment sets a predetermined rating for an interference condition in a channel, and downgrades said rating by one level if it is assessed that said channel faces said mutual interference, and upgrades said rating by one level if it is not assessed that said channel faces said mutual interference, and detects an interference by constant or intermittent interference waves by classifying said reception conditions of channels based on said rating in a predetermined time.

2. The wireless communication control method according to claim 1, wherein said wireless communication devices are a master device and a slave device that perform Adaptive Frequency Hopping providing 79 channels, each of said 79 channels having 1 MHz bandwidth in the 2.4 GHz band, said Adaptive Frequency Hopping being configured to switch channels at a rate of 1600 times per second, and said reception condition of channels are classified into "Good," "Unknown," or "Bad."

3. A wireless communication device comprising:
means for employing an Adaptive Frequency Hopping that switches among a plurality of channels except a channel subject to interference by interference waves in a predetermined frequency;
means for creating a hopping pattern using available channels;
means for setting channels used for communication being based on said hopping pattern;
means for processing received signals on said channels;
means for assessing reception conditions of channels said by both a first assessment means for detecting a group of abnormal conditions in communication caused by interference waves, and a second assessment means for detecting an abnormal condition in communication caused by mutual interference with constant or intermittent interference waves from said group of abnormal conditions,
wherein said first assessment means detects said group of abnormal conditions based on reception error information and Receive Signal Strength Indicator (RSSI), and
wherein said first assessment means assesses an interference by interference waves exists if both said reception error information is detected and said RSSI is larger than a predetermined set value, and wherein said first assessment means assesses that an interference by interference waves does not exist if at least one of said reception error information is not detected and said Receive Signal Strength Indicator is not larger than the predetermined value, and
wherein said second assessment means sets a predetermined rating for an interference condition in a channel, and downgrades said rating by one level if it is assessed that said channel faces said mutual interference, and upgrades said rating by one level if it is not assessed that said channel faces said mutual interference, and detects an interference by constant or intermittent interference waves by classifying said reception conditions of channels based on said rating in a predetermined time.

4. The wireless communication device according to claim 3, wherein said wireless communication device is composed of a master device and a slave device that perform Adaptive Frequency Hopping, each of said 79 channels having 1 MHz bandwidth in the 2.4 GHz band, said Adaptive Frequency Hopping being configured to switch channels at a rate of 1600 times per second, and said reception condition of channels are classified into "Good," "Unknown," or "Bad."

5. A wireless communication device comprising:
a central processing unit (CPU) being configured to employ Adaptive Frequency Hopping being arranged to switch among a plurality of channels except a channel subject to interference by interference waves in a predetermined frequency band for communication;
a radio frequency (RF) circuit being configured to convert a received signal of a set channel into received data; a baseband circuit being configured to set channels in said RF circuit and to process said received data, and to create a hopping pattern by assessing reception conditions of said channels with both a first assessment being configured to detect a group of abnormal conditions in communication caused by interference waves, and a second assessment being configured to detect an abnormal condition in communication caused by mutual interference with constant or intermittent interference waves from said group of abnormal conditions,
wherein said baseband circuit detects said group of abnormal conditions based on reception error information and Received Signal Strength Indicator in said first assessment, and
wherein in said first assessment, said baseband circuit assesses that an interference by interference waves exist if both said reception error information is detected and said Received Signal Strength Indicator is larger than a predetermined set value, and wherein said first assessment assesses that an interference by interference waves does not exist if at least one of said reception error information is not detected and said Receive Signal Strength Indicator is not larger than the predetermined value, and
wherein in said second assessment, said baseband circuit sets a predetermined rating for an interference condition in a channel, and downgrades said rating by one level if it is assessed that said channel faces said mutual interference, and upgrades said rating by one level if it is not assessed that said channel faces said mutual interference, and detects an interference by constant or intermittent interference waves by classifying said reception conditions of channels based on said rating in a predetermined time.

6. The wireless communication device according to claim 5, wherein said wireless communication device is composed of a master device and a slave device that perform Adaptive Frequency Hopping, each of said 79 channels having 1 MHz bandwidth in the 2.4 GHz band, said Adaptive Frequency Hopping being configured to switch channels at a rate of 1600 times per second, and said reception condition of channels are classified into "Good," "Unknown," or "Bad."

* * * * *